United States Patent [19]

Braudaway et al.

[11] Patent Number: 5,136,714
[45] Date of Patent: Aug. 4, 1992

[54] METHOD AND APPARATUS FOR IMPLEMENTING INTER-PROCESSOR INTERRUPTS USING SHARED MEMORY STORAGE IN A MULTI-PROCESSOR COMPUTER SYSTEM

[75] Inventors: Gordon W. Braudaway, Carmel, N.Y.; Ben J. Nathanson, Teaneck, N.J.

[73] Assignee: International Business Machines Corporation, Armonk, N.Y.

[21] Appl. No.: 445,202

[22] Filed: Dec. 4, 1989

[51] Int. Cl.$^5$ .................. G06F 13/00; G06F 15/16
[52] U.S. Cl. .................. 395/725; 364/DIG. 1; 364/228.1; 364/230.2; 364/242.91
[58] Field of Search ... 364/200 MS File, 900 MS File; 395/725

[56] References Cited

U.S. PATENT DOCUMENTS

| | | | |
|---|---|---|---|
| 4,128,881 | 12/1978 | Yamamoto et al. | 364/200 |
| 4,561,051 | 12/1985 | Rodman et al. | 364/200 |
| 4,941,083 | 7/1990 | Gillett, Jr. et al. | 364/200 |
| 4,949,239 | 8/1990 | Gillett, Jr. et al. | 364/200 |

*Primary Examiner*—Eddie P. Chan
*Attorney, Agent, or Firm*—Whitham & Marhoefer

[57] ABSTRACT

An inter-processor interrupt mechanism is implemented in a shared-memory multi-processor system. A dedicated halfword for each processor in said multi-processor system is provided in the shared memory restricted in use to the generation and control of inter-processor interrupts. No data in any dedicated shared-memory location can be altered by any processor unless it has "captured" the location by executing a test and set halfword instruction and a captured shared-memory location being released only by executing a store halfword instruction. An address comparator and a zero detector are added as adjunct operations to read-modify-write logic of each processor's memory interface. When any instruction is executed and its operand address agrees with that contained in the address comparator, an inter-processor interrupt request is generated if zero is not detected on all predefined data bits being written to memory. If a zero is detected on all predefined data bits being written to memory, the inter-processor interrupt request is removed.

8 Claims, 3 Drawing Sheets

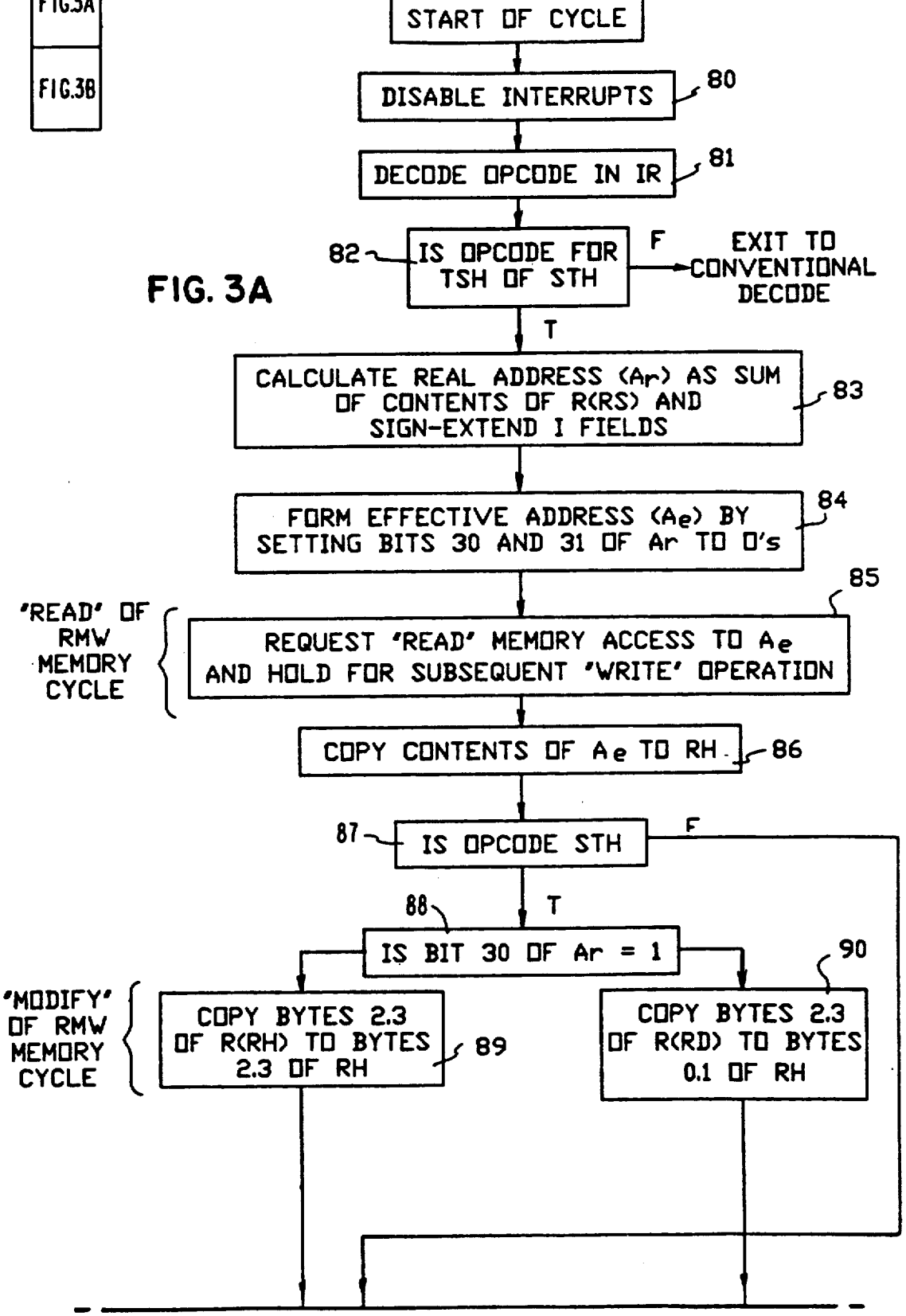

METHOD AND APPARATUS FOR IMPLEMENTING INTER-PROCESSOR INTERRUPTS USING SHARED MEMORY STORAGE IN A MULTI-PROCESSOR COMPUTER SYSTEM

BACKGROUND OF THE INVENTION

1. Field of the Invention

The present invention generally relates to inter-processor communication in a multi-processor (MP) computer system and, more particularly, to an implementation of interrupts directed to a specific processor by its peers in the system.

2. Description of the Prior Art

High performance, MP computer systems are being developed to increase throughput by performing in parallel those operations which can run concurrently on separate processors. Such high performance, MP computer systems are characterized by multiple central processor (CPs) operating independently and in parallel, but occasionally communicating with one another or with a shared memory storage (MS) (i.e., a memory that can be read from and written into by all of the processors) when data needs to be exchanged.

Specific examples of prior art multi-processor systems are shown, for example, in U.S. Pat. No. 3,528,061 to Zurcher, Jr. and U.S. Pat. No. 3,528,062 to Lehman et al. Zurcher, Jr. discloses a multi-processor environment which regulates access to shared memory and allows a processor to lock the memory location for exclusive use. Lehman et al. discloses a multi-processor shared memory system. The Lehman et al. system has storage means accessible to each of the processors wherein different combinations of bits are used to communicate the status of the shared memory.

Communication between processors in a multi-processor system can be accomplished via a shared memory location having a particular address in the MS. Each processor is assigned a distinct memory location whose address is its "interrupt address". The memory location of each interrupt address which may be written to by all processors in the system. When a non-zero value is written into the location at a processor interrupt address, an interrupt is generated for that processor causing it to alter its sequence of instruction execution in a known and organized manner. Such inter-processor interrupts directed to a specific processor by its peers are considered a necessary means of implementing communication and synchronization in a multi-processor configuration. There are, however, several problems associated with MP interrupt handling. Specifically, if memory access is granted on a first-come-first-serve basis, a processor will see only the identity of the last processor that generated an interrupt for it. The problem is to provide a way to guarantee that the interrupted processor will be able to unambiguously identify all processors that interrupt it, even when the interrupts come in quick succession.

SUMMARY OF THE INVENTION

It is therefore an object of the present invention to provide inter-processor communication in a multi-processor computer system in which a processor is able to identify all of its peers in the system that interrupted it.

It is another object of the invention to provide a multi-processor communication system that guarantees that an interrupted processor can resolve each of its interrupts without losing track of an interrupt that it has not yet resolved.

It is a further object of the invention to provide a multi-processor communication system of the type described which accomplishes these objectives using conventional memory references into an memory shared by all processors.

According to the invention, there is provided a technique for implementing those interrupts employing shared memory locations and intercepts of read-modify-write (RMW) memory references. In the context of its use here, the term "read-modify-write" means that an instruction will read the data contents of a shared memory location, modify a part of the data, and write the modified data back into the same location while not permitting any other processor to reference the location between the read and write operations.

The inter-processor interrupt mechanism is implemented in a shared-memory multi-processor system following these simple rules:

1. Each processor has a dedicated location in shared memory restricted in use to the generation and control of its inter-processor interrupts. No data in any dedicated shared-memory location is to be altered by any processor unless it has "captured" the location by executing an instruction, called a test and set halfword (TSH) instruction.

2. No release of a captured shared-memory location is to be made except by executing a instruction, called a store halfword (STH) instruction.

3. An address comparator and a zero detector are added as adjunct operations to the red-modify-write logic of each processor's memory interface.

4. Each processor's address comparator monitors the shared-memory reads and writes of all processors. When a comparator detects nonzero data written to selected bits at its processor's interrupt address, it generates an interrupt signal for its processor. The interrupt signal is removed when the comparator detects that zeros have been written to the selected bits. In this context, "selected" bits means that only a predefined group of bits, not all bits, are examined by the zero detector.

BRIEF DESCRIPTION OF THE DRAWINGS

The foregoing and other objects, aspects and advantages will be better understood from the following detailed description of a preferred embodiment of the invention with reference to the drawings, in which:

FIGS. 3A and 3B, taken together, are a flow diagram of the execution sequence for STH and TSH instructions with inter-processor interrupts according to the invention.

DETAILED DESCRIPTION OF A PREFERRED EMBODIMENT OF THE INVENTION

Figure 1:
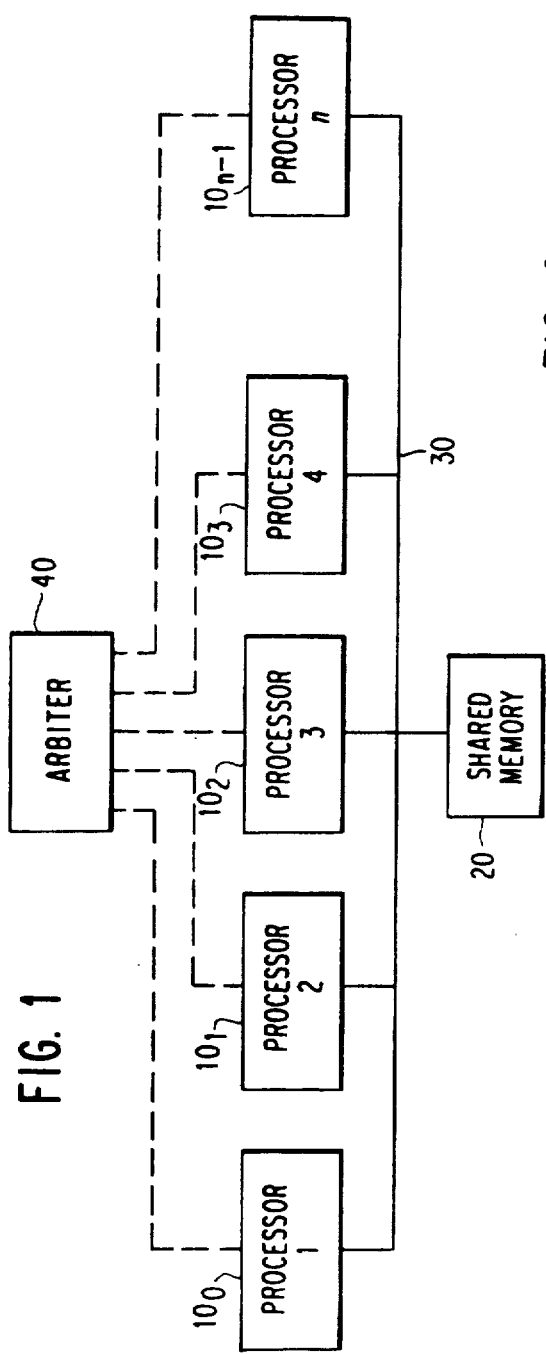
FIG. 1 is a block diagram of a multi-processor system in which the present invention may be used.

Referring now to the drawings, and more particularly to FIG. 1, there is shown a typical shared-memory computer in which the invention may be used. Processors $10_0, 10_1, \ldots, 10_n$ share access to a common memory 20 via a bidirectional memory bus 30. Only one processor at a time may use the bus to access the memory. An arbiter circuit 40 prevents simultaneous accesses. Processors requiring the bus make requests to the arbiter, which then grants access to a single processor.

If no other processors request the bus, the processor requesting the bus will be permitted to continue writing to and reading from the memory. If other requests arrive, the arbiter may choose to deny further access to the current processor and grant access to another processor.

It is sometimes important that a processor be allowed to complete two memory accesses in succession; i.e., a read, followed by a write to the same location. No other processor may read or write to the location in that time, or logically inconsistent results will occur. The processor signals the arbiter that it is performing this sequence, called read-modify-write, to ensure that it will not lose control of the bus between the read and the write.

While memory access is managed at a low level by the arbiter, it sometimes is necessary to coordinate processor activities at a higher level. To do this, processors may signal each other via an interrupt mechanism. A processor receiving such an interrupt will stop running the program it is working on and read a message sent by another processor.

If every processor were to have an interrupt line directly connected to every other processor, the number of wires would become unmanageable (n processors require $n^2-n$ wires). This invention eliminates the need for additional interrupt wiring, using instead the pre-existing multi-processor facilities of shared memory and the read-modify-write sequence.

Briefly described, a processor that wishes to signal another does so by writing to a shared memory location. Each processor has a distinct "interrupt address". If processor $10_0$ wishes to signal processor $10_1$, it writes its identity, for example, the number $ID_0$, to processor $10_1$'s interrupt address. Each processor has circuitry that monitors the bus looking for accesses to its own interrupt address. When the circuitry at processor $10_1$ finds that its interrupt address is being accessed, it interrupts the processor. Processor $10_1$ can then read the number of the processor that interrupted it, in this case $ID_0$, from the memory. Processor $10_1$ then turns off the interrupt by writing zeros to its interrupt address.

The description is incomplete, however. It may happen that several processors, say $10_0$, $10_2$ and $10_3$, wish to signal processor $10_1$ simultaneously. Each processor, as it gains access to the interrupt address, will overwrite the identity of the previous interrupting processor. There is no guarantee that in such a case, processor $10_1$ will get an opportunity to read its interrupt address after each interrupt. It is likely, rather, that two or more interrupts will take place first. For instance, if the arbiter 40 grants memory in a first-come-first-serve sequence, it is guaranteed that processor $10_1$ will see only the identity of the last processor that interrupted it.

Nor is it possible for each processor to add its identity in an obvious way. If each processor were to read the memory 20, add its identity to what it read, and then write the value back, the processors would again risk overwriting each other's identity. Consider the case where processors $10_0$, $10_2$ and $10_3$ all interrupt processor $10_1$. First, processor $10_0$ reads from the address, so as to add its identity to any identities it finds. Then, the arbiter 40 lets processor $10_2$ read from the address, then processor $10_3$. Each of the processors reads a memory location showing no pending interrupts, adds its identity to it, then writes. In this case, it is again true that processor $10_1$ will see only the identity of the processor that performed the last write.

The problem remains to clear the interrupts after they are serviced. Here again, there is no guarantee of desired results. Due to indeterminate execution delays, another processor may gain access to memory and cause an interrupt to processor $10_1$ just before processor $10_1$'s zeros are actually written into the memory 20. Then, there is a brief interrupt, immediately canceled, and the processor cannot learn which of its peers caused the interrupt.

The invention described herein guarantees that the interrupted processor will be able to read the identity of all processors that interrupt it, even when the interrupts come in quick succession. It guarantees further that the interrupted processor can clear the interrupts individually without clearing an interrupt it has not read. It is extensible to any number of processors by a means that will be described. The description uses instructions from an actual processor, but the technique may use other instructions.

Figure 2:
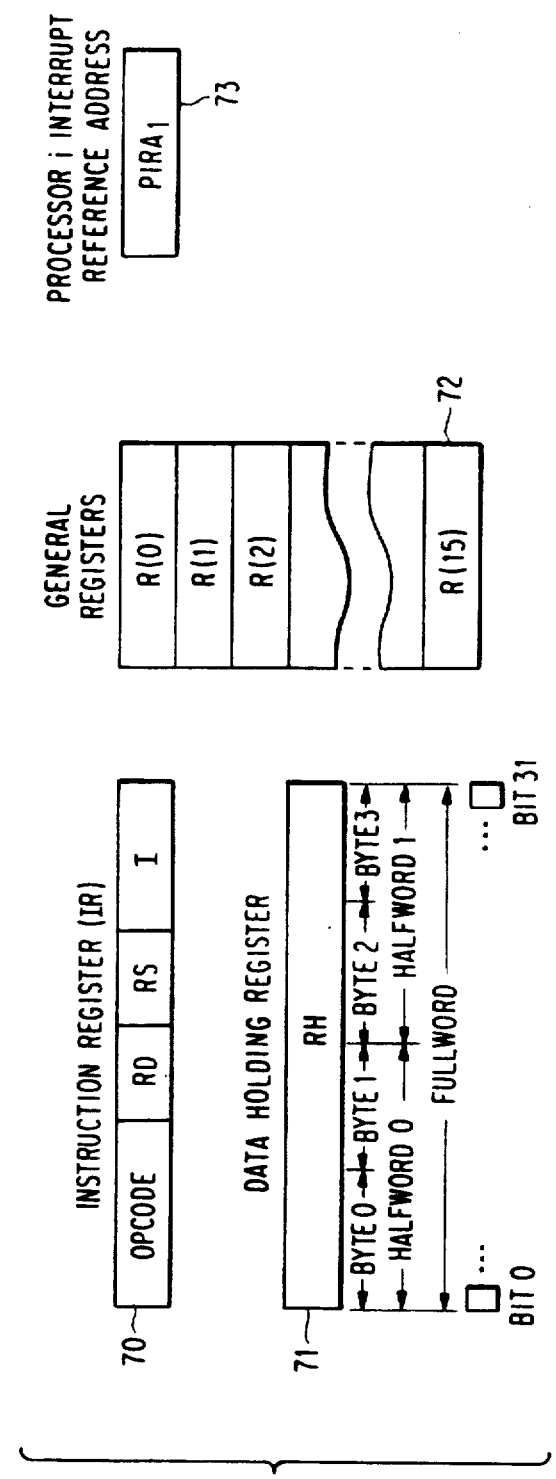
FIG. 2 is map of the registers of each one of the processors shown in FIG. 1.

FIG. 2 shows the registers of processor i, $i=0, \ldots,$ n. These include an instruction register (IR) 70, a data holding register 71, general registers 72, and a processor i interrupt reference address register 73. For illustration, it is assumed that the individual processors in the multi-processor configuration read from and write into shared memory, and that those memory references are in units of fullwords. It is further assumed that each processor's instruction set has at least two instructions (to be specified later) that store data into shared memory in units of halfwords. Exploitation of memory references that use the RMW path is a key part of the approach presented here.

A specific pair of processor instructions are used to implement inter-processor interrupts. They are "Test and Set Halfword" (TSH) and "Store Halfword" (STH). The STH instruction is a conventional data store operation that copies contents of the low-order half of a software-designated fullword register into a specified memory location. The important details are that data is copied from a software-designated general register 72 into a shared memory location and goes to completion without interruption while maintaining exclusive access to the specified memory location. The important details of the TSH instruction are that the instruction copies a value from a specified memory location into the low-order half of a software-designated fullword general register 72, and while leaving the copied data in that general register unaltered, the instruction sets a predefined group of data bits to ones and writes the modified data back into the memory location. The TSH instruction must complete its RMW sequence while maintaining exclusive access to the specified memory location and must go to completion without interruption.

An example TSH instruction format is as follows:

| TSH opcode | RD | RS | I |
|---|---|---|---|
| 0 | 7 8 | 12 16 | 31 |

For illustration and discussion, the TSH functions as follows:

1. The real memory address, $A_r$, is calculated as the contents of the general register 72 designated by the index contained in RS plus the sign-extended I field.

2. The contents of the addressed halfword and its adjacent neighbor that form an addressable fullword are read from the addressed memory location into a holding register 71. (As used here, "adjacent neighbor" is defined as the halfword whose address is identical except for the next-to-least-significant address bit, which is complemented.)

3. Data contained in the addressed halfword is copied from the holding register 71 into the low-order halfword of the general register 72 designated by the index contained in RD.

4. The high-order halfword of that general register is set to zero.

5. The eight high-order bits of the addressed halfword that was placed in the holding register 71 are changed to ones.

6. The contents of the fullword holding register 71 are written back into the addressed halfword memory location and its adjacent neighbor.

An example STH instruction format is as follows:

| STH opcode | RD | RS | I |
|---|---|---|---|
| 0 | 7 8 | 12 16 | 31 |

The example STH instruction functions as follows:

1. The real memory address, $A_r$, is calculated as the contents of the general register 72 designated by the index contained in RS plus the sign-extended I field.

2. The contents of the addressed halfword and its adjacent neighbor that form an addressable fullword are read from memory into a holding register 71.

3. The contents of the low-order halfword of the general register 72 designated by the index contained in RD are copied into the addressed halfword in the holding register 71.

4. The contents of the holding register 71 are written back into the addressed memory location.

Figure 3B:
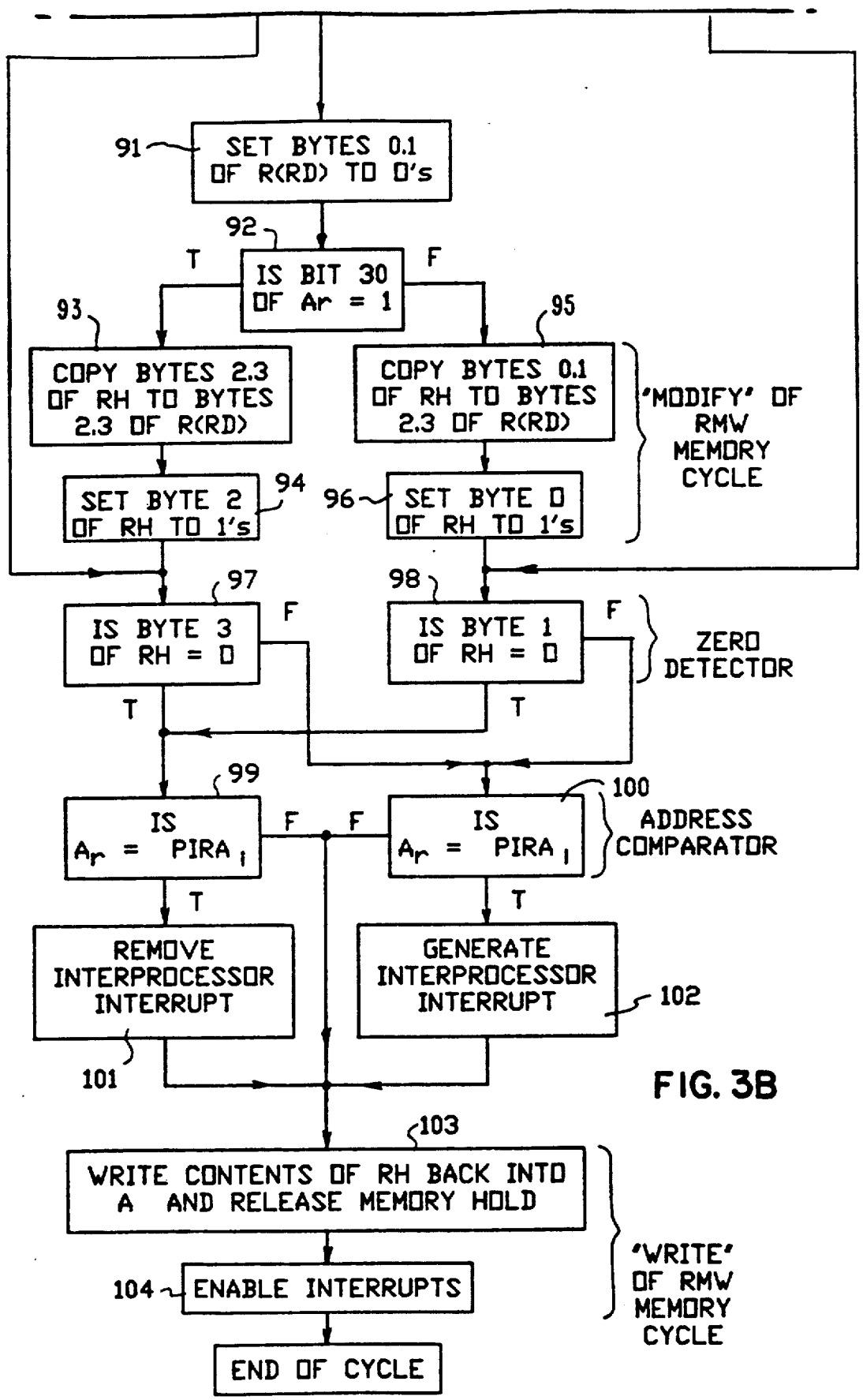

Each processor of the multi-processor system is assigned a unique halfword in shared memory to be used for generation and control of its inter-processor interrupts. Shared memory locations can be read from and written into by each of the "n" processors. The "n" halfword locations will be referred to as IPINT(0), IPINT(1), ..., IPINT(n−1), and will correspond to processors 0, 1, ..., n−1, respectively. The address of memory location IPINT(i) is loaded into the processor interrupt reference address register 73 for processor "i" (PIRA$_i$) when that processor is initialized and remains unchanged from then on. The contents of PIRA$_i$ are compared to each real memory address, $A_r$, to determine whether an inter-processor interrupt condition is to be generated or removed. This is shown in FIGS. 3A and 3B. By convention, no data will ever be written into any IPINT(i) location unless that location has been "captured" by the processor doing the writing. The convention of capturing will be explained later. Further, only two instructions, TSH and STH, will be used to write data into locations IPINT(i).

Referring now to FIGS. 3A and 3B, the process begins by first disabling interrupts in function block 80 and then decoding the opcode in instruction register 70 in function block 81. A test is then made in decision block 82 to determine if the opcode is for a TSH or STH instruction. If not, the process exits to a conventional decode operation. On the other hand, if the opcode is for either a TSH or STH instruction, the real address, $A_r$, is calculated as the sum of the contents of R(RS), where the notation R(x) means the register designated by the x field of the instruction, and the sign-extended I field in function block 83. Then, in function block 84, the effective address, $A_e$, is formed by setting, bits 30 and 31 of the real address, $A_r$, to zeros. (Setting bits 30 and 32 of $A_e$ to zeros determines the fullword address of the location that contains the addressed halfword and its adjacent neighbor.)

At this point the process enters the "read" portion of the RMW sequence. In function block 85, a request for "read" memory access to $A_e$ is made. The effective address, $A_e$, is held for the subsequent "write" operation. The contents of $A_e$ are copied to holding register 71 in function block 86. A test is made in decision block 87 to determine if the opcode is for an STH instruction or for a TSH instruction. If the former, a further test is made in decision block 88 to determine if bit 30 of the real address, $A_r$, is a one. If so, bytes 2 and 3 of R(RD) are copied to bytes 2 and 3 of the holding register 71 in function block 89; otherwise, bytes 2 and 3 of R(RD) are copied to bytes 0 and 1 of the holding register 71 in function block 90. These operations are the "modify" portion of the RMW sequence in the case of an STH instruction.

Returning to decision block 87, assume that the opcode is for a TSH instruction. In that case, the bytes 0 and 1 of R(RD) are set to zeros in function block 91. A test is made in decision block 92 to determine if bit 30 of the real address, $A_r$, is one. If it is, bytes 2 and 3 of holding register 71 are copied to bytes 2 and 3 of R(RD) in function block 93, and then in function block 94, byte 2 of the holding register 71 is set to ones. On the other hand, if bit 30 of the real address, $A_r$, is a zero, bytes 0 and 1 of the holding register 71 are copied to bytes 2 and 3 of R(RD) in function block 95, and then in function block 96, byte 0 of the holding register is set to ones. Blocks 93, 94, 95, and 96 constitute the "modify" portion of the RMW cycle for the TSH instruction.

Function blocks 89 and 94 enter decision block 97, and function blocks 90 and 96 enter decision block 98. These decision blocks constitute the zero detector logic. More specifically, in decision block 97, a test is made to determine if byte 3 of the holding register 71 is zero, and in decision block 98, a test is made to determine if byte 1 of the holding register 71 is zero. If either of these tests is true, the process goes to decision block 99 where a test is made to determine if the real address, $A_r$, is equal to PIRA$_i$ (processor interrupt reference address for processor i). The same test is made in decision block 100 if either of the tests in decision blocks 97 and 98 is false. The decision blocks 99 and 100 comprise the address comparator logic. If the test in decision block 99 is true, then the inter-processor interrupt for processor i is removed in function block 101. If the test in decision block 100 is true, then an inter-processor interrupt for processor i is generated in function block 102.

A false output from either of decision blocks 99 and 100 or the outputs of either of function blocks 101 and 102 go to function block 103 where the contents of the holding register 71 are written back into the effective address, $A_e$, and the memory hold is released. Then, interrupts are enabled in function block 104 before the cycle ends. Function blocks 103 and 104 constitute the "write" portion of the RMW sequence.

The first byte (bits 0 through 7) of each memory location IPINT(i) is called a "guard byte" and is used to govern control of the location. Control of an IPINT(i)

memory location is captured by executing a TSH instruction that addresses the location. If the third byte of the software-designated register loaded by the TSH instructions contains zeros (the third byte contains the guard byte), then a capture has been effected. Since the TSH instruction always sets the guard byte to ones, any other processor subsequently attempting to capture the same memory location will read a halfword with its guard byte set to ones, an indication that the capture did not succeed. Because TSH reads, modifies and writes the specified memory location in an uninterruptible sequence, capture of control of a shared-memory location is completely unambiguous.

An IPINT(i) memory location is released from capture by execution of a STH instruction that writes zeros into the guard byte of the location. The same register loaded by the TSH instruction can be used as the data source for the subsequent STH instruction, since the guard byte in that register, unless modified, will contain all zeros.

Bits in the low-order bytes of locations IPINT(i) are used to generate inter-processor interrupt requests. If bits 8 through 15 correspond to processors 0 through 7, then any processor "j" can initiate an inter-processor interrupt request for processor "i" by placing a one in bit "j+8" of location IPINT(i). The reason for employing an instruction that uses RMW logic now becomes clear. If an address comparator and a zero detector are placed adjacent to the RMW logic, unambiguous interrupt requests can be generated. The address comparator is used to isolate RMW references to the particular location associated with a processor. The zero detector is used to generate and remove an inter-processor interrupt request to that processor. If any data bit 8 through 15 being written to IPINT(i) is a one, an inter-processor interrupt request for processor "i" is generated. If the same data bits being written to IPINT(i) are zeros, an inter-processor interrupt request for processor "i" is removed. An example showing how this works is presented below.

Various aspects of the inter-processor interrupt sequence will be shown in the following example, with reference to FIG. 1. Let the shared-memory inter-processor interrupt locations be the unique IPINT(i), i=0, ..., 7. Let the locations IPINT(i) be initialized to 0. If processor 2 now desires to generate an inter-processor interrupt for processor 3, processor 2 executes a TSH instruction specifying memory locations IPINT(3). Since the guard byte of IPINT(3) is initially 0, the register in processor 2 loaded by its TSH instruction will contain:

| 00000000 00000000 | 00000000 00000000 | signifying that processor 2 has captured location IPINT(3), and IPINT(3) will contain:

| 11111111 | 00000000 | after the TSH instruction completes execution. At this instant, processor 4 may attempt to capture IPINT(3) to generate an inter-processor interrupt for processor 3, also. The register in processor 4 loaded by its TSH instruction contains:

| 00000000 00000000 | 11111111 00000000 | signifying that IPINT(3) was not captured, and IPINT(3) remains unchanged after the TSH instruction completes execution. Processor 4 must test the guard byte for capture (all zeros), and finding it not zero, must re-execute the TSH instruction again and again until it is able to capture IPINT(3).

Processor 2, having captured IPINT(3), initiates an inter-processor interrupt request by logically ORing a one into its bit position in the register loaded by the TSH instruction. The register in processor 2 then contains:

| 00000000 00000000 | 00000000 00100000 |

The contents of the register are then written by processor 2 back into IPINT(3) using an STH instruction. This resets the guard byte in IPINT(3). Because a bit being written to the low-order byte of IPINT(3) is not zero (as detected within the zero-detection logic), an inter-processor interrupt request to processor 3 is generated. Processor 4, which has been in a loop executing TSH instructions on a guarded IPINT(3) now captures the unguarded IPINT(3), and, in a similar manner, generates its own inter-processor interrupt request to processor 3. Note that the execution of a TSH instruction by processor 4 will now redundantly generate an interrupt request for processor 3, whereas each earlier execution of the TSH instruction by processor 4 referencing IPINT(3) had redundantly removed the interrupt request for processor 3.

In due course, the inter-processor interrupt request is accepted by processor 3. When accepted, further inter-processor interrupt requests for processor 3 are masked, and, if generated, will remain pending until either removed or unmasked and accepted. The interrupt handler in processor 3 must itself capture IPINT(3) to determine which processor or processors have requested the interrupt. If it finds the guard byte set, as it will in this example (since processor 4 has captured it), it must repeatedly re-execute its TSH instruction until it captures IPINT(3). After processor 4 initiates its inter-processor interrupt request and executes a STH instruction, IPINT(3) contains:

| 00000000 | 00101000 | and the inter-processor interrupt request for processor 3 is again redundantly generated. The next execution of a TSH instruction in processor 3 captures IPINT(3), loading the designated register in processor 3 with:

| 00000000 00000000 | 00000000 00101000 | and storing into IPINT(3):

| 11111111 | 00101000 |

Again, the inter-processor interrupt request is redundantly generated for processor 3.

Processor 3 reads and saves all interrupt requests (in this example, those from processors 2 and 4), and stores a halfword 0 into IPINT(3) using STH. The zero detector in the RMW logic sequence finds that all low-order bits being written to IPINT(3) are zeros and clears the inter-processor interrupt request for processor 3.

When processor 3 finishes processing all interrupt requests, (it may issue other inter-processor interrupts itself) it may recapture IPINT(3) before returning to its preempted instruction sequence. If it finds any low-order bits set to ones, the interrupt handler may recycle within itself and process those waiting interrupt requests, knowing that if it attempts to return to its preempted instruction sequence, it will be interrupted immediately. To recycle within the interrupt handler can save two state changes for processor 3. Under some conditions, however, it may be undesirable for the interrupt handler to recycle within itself. For instance, if inter-processor interrupts are not the highest priority within their interrupt class, the interrupt handler may be required to yield control of the processor by enabling its interrupt class and attempting to return to its preempted instruction sequence.

Note that when an IPINT(i) is captured by any processor, it is possible for some or all other processors to be held in a short instruction loop waiting for release of the guarded memory location. It is important, therefore, that the instruction sequences which process data in a captured memory location be as short as feasible.

In summary, the inter-processor interrupt mechanism according to the invention is implemented in a shared-memory multi-processor following these simple rules:

1. Each processor has a dedicated halfword in shared memory restricted in use to the generation and control of its inter-processor interrupts. No data in any dedicated shared-memory location is to be altered by any processor unless it has "captured" the location by executing a TSH instruction.

2. No release of a captured shared-memory location is to be made except by executing a STH instruction.

3. An address comparator and a zero detector are added as adjunct operations to the read-modify-write logic of each processor's memory interface.

4. When any instruction is executed and its operand address agrees with that contained in the address comparator, an inter-processor interrupt request is generated if zero is not detected on all low-order data being written to memory. If a zero is detected on all low-order data being written to memory, the inter-processor interrupt request is removed.

The mechanism can be expanded to an unlimited number of processors by using each bit of IPINT(i) as an indicator that a request has been raised by one of a group of processors. It is not limited to eight processors as shown in the example. Also, the precise form and format of the STH and TSH instructions are not important. Only their function and implementation using read-write-modify memory access are important.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. An inter-processor interrupt mechanism implemented in a shared-memory multi-processor system comprising:

a plurality of dedicated address locations, one for each processor of said multi-processor system, in a shared memory, each said dedicated address location being restricted in use to the generation and control of inter-processor interrupts;

a plurality of instruction execution means, one for each processor, for writing to a dedicated shared-memory location by any processor only when said any processor captures the location by executing a first instruction type and for releasing a captured shared-memory location by executing a second instruction type;

a plurality of address comparator means, one for each processor, for examining an address of each write to shared memory and determining whether the address of the write is that of its dedicated address location;

a plurality of zero detector means, one for each processor, for detecting zeros in predefined data bits being written to the dedicated address location, and a plurality of means, one for each processor and responsive to said comparator means and said zero detector means, when any write to shared memory occurs and the address written to agrees with that of the dedicated address location, for generating an inter-processor interrupt request if said zero detector means does not detect a zero in predefined data bits being written to memory, but if a zero is detected in predefined data bits being written to memory, removing the inter-processor interrupt request.

2. The inter-processor interrupt mechanism recited in claim 1 wherein said dedicated address location is a halfword and wherein said first instruction type is a test and set halfword instruction and said second instruction type is a store halfword instruction.

3. A method of inter-processor interrupt processing implemented in a shared-memory multi-processor system comprising the steps of:

providing a dedicated address location for each processor of said multi-processor system in a shared memory, said dedicated address location being restricted in use to the generation and control of inter-processor interrupts;

writing to a dedicated shared-memory location by any processor only when said any processor captures the location by executing a first instruction type;

releasing a captured shared-memory location by executing a second instruction type;

examining by each processor an address of each write to said shared memory and determining whether the address of the write is that of its dedicated address location;

detecting by each processor zeros in predefined data bits being written to memory; and when any write to shared memory occurs and the address written to agrees with that of said dedicated address location, generating an inter-processor interrupt request if a zero is not detected in the predefined data bits being written to memory, but if a zero is detected in the predefined data bits being written to memory, removing the inter-processor interrupt request.

4. The method of inter-processor interrupt processing recited in claim 3 wherein said dedicated location is a halfword and wherein said first instruction is a test and set halfword instruction and said second instruction type is a store halfword instruction.

5. A method of inter-processor communication in a multi-processor system including a shared memory system and supporting a read-modify-write instruction sequence in accessing said shared memory system, each processor of said multi-processor system including an instruction register for temporarily storing an instruction, a data holding register for temporarily storing data and a processor interrupt reference register as well as one or more general registers for temporarily storing data, said method comprising the steps of:

providing a dedicated location in said shared memory system for each processor of said multi-processor system, said dedicated address space being restricted in use to the generation and control of inter-processor interrupts, said processor interrupt reference register for each processor storing an address of the dedicated location for that processor;

executing said read-modify-write instruction sequence by one processor to read a dedicated memory location and holding said memory location for a subsequent write operation to capture another processor's dedicated location in said shared memory system;

reading by said one processor contents of said dedicated location into its data holding register;

determining by said one processor if an instruction in said instruction register is a first instruction type or a second instruction type;

comparing a real memory address of said instruction with the address stored in said processor interrupt reference registers of all processors;

copying data from a general register to said holding register;

testing said copied data in said holding register for zeros;

generating an inter-processor interrupt request when any write to said shared memory system occurs only when said one processor captures the location and the address written to agrees with said address in said processor interrupt reference address register and a zero is not detected in predefined data bits in the step of testing;

but if zeros are detected in the step of testing in said predefined data bits, removing the inter-processor interrupt request when an instruction is executed and its operand address agrees with said address in said processor interrupt reference register; and writing the contents of said holding register back to said dedicated memory location and releasing memory hold for that location.

6. The method recited in claim 5 wherein memory references are in units of fullwords and said first instruction type is a test and set halfword instruction and said second instruction type is a store halfword instruction.

7. The method recited in claim 6 wherein if the instruction type is a test and set halfword instruction, said method further comprising the steps of:

calculating a real memory address as the contents of the general register;

reading contents of an addressed halfword and its adjacent halfword neighbor that form an addressable fullword from the addressed memory location into said holding register;

copying data contained in the addressed halfword into a low-order halfword of a general register;

changing high-order bits of the addressed halfword to ones in said holding register; and writing contents of the holding register back into the addressed fullword memory location.

8. The method recited in claim 6 wherein if the instruction is a store halfword instruction, said method further comprising the steps of:

calculating a real memory address;

reading contents of an addressed halfword and its adjacent halfword neighbor that form an addressable fullword from the addressed memory location into said holding register;

copying contents of the low-order halfword of the general register designated by a second index field into the addressed halfword in said holding register; and writing contents of the holding register back into the addressed fullword memory location.

* * * * *